United States Patent [19]

Dehnert

[11] Patent Number: 5,075,682

[45] Date of Patent: Dec. 24, 1991

[54] ANTENNA MOUNT AND METHOD FOR TRACKING A SATELLITE MOVING IN AN INCLINED ORBIT

[76] Inventor: Douglas K. Dehnert, Rte. #1, St. Helaire, Minn. 56754

[21] Appl. No.: 502,525

[22] Filed: Mar. 30, 1990

[51] Int. Cl.[5] .............................................. H04B 7/216

[52] U.S. Cl. ..................................... 342/352; 342/356; 343/765; 343/880; 343/915

[58] Field of Search ............... 342/352, 356, 357, 358, 342/359; 455/12; 364/459; 343/765, 766, 882, 880, 915, 813, 894

[56] References Cited

U.S. PATENT DOCUMENTS

| | | | |
|---|---|---|---|
| 3,271,565 | 9/1966 | Blackman | 342/352 X |
| 3,316,552 | 4/1967 | Reid | 455/11 X |
| 3,747,095 | 7/1973 | Wilson | 342/356 |
| 4,628,323 | 9/1986 | Crean | 343/765 |
| 4,716,416 | 12/1987 | Smith et al. | 343/915 |
| 4,819,002 | 4/1989 | Reboullet | 343/882 X |
| 4,875,052 | 10/1989 | Anderson et al. | 343/882 X |

*Primary Examiner*—Thomas H. Tarcza
*Assistant Examiner*—Tod Swann
*Attorney, Agent, or Firm*—Price, Heneveld, Cooper, DeWitt & Litton

[57] ABSTRACT

A single axis tracking system for a satellite moving in an inclined orbit. A linear antenna mount is used which is equipped for longitudinal tilt adjustment to enable an antenna to accurately track the longitudinal centerline of the figure 8 path of a satellite in an inclined orbit from any geographic location within the footprint of the satellite. The trajectory of the satellite is determined relative to the geographic location of the antenna mount. A time referenced tracking control signal moves the antenna mount. The signal from the satellite is periodically sampled and compared with stored values to verify the calculated trajectory. If a significant deviation occurs over a predetermined period, a new trajectory is automatically calculated and the time referenced trajectory signal is adjusted accordingly.

21 Claims, 3 Drawing Sheets

ANTENNA MOUNT AND METHOD FOR TRACKING A SATELLITE MOVING IN AN INCLINED ORBIT

BACKGROUND OF THE INVENTION

When a geostationary satellite is launched, the hope is that the satellite will land in a circular orbit above the equator at an altitude of 35,800 kms. When properly located in this orbit, the satellite will move in a circular orbit in time with the rotation of the earth about its polar axis so that the satellite appears from any point on earth to be stationary. The geostationary satellite also has a 0° inclination relative to a plane drawn through the equator. In order to maintain the satellite in this position, thrust engines must be periodically fired on the satellite, usually under the control of a ground station. The fuel and thrust engines necessary for this purpose usually account for approximately 40% of the initial weight of the satellite that is launched into space.

When a geostationary satellite is launched and something unanticipated occurs, it is possible for the satellite to land in space close to, but not at, the desired geostationary position. The thrust engines on the satellite can then be used to maneuver the satellite into its proper parking position in the equatorial orbit. The amount of fuel used in maneuvering the satellite can be significant and has a direct effect on the useful lifetime of the satellite. A typical geostationary satellite uses up its maneuvering fuel over the course of approximately 7 to 8 years. The electronics on board the satellite can still be functioning properly; however, the fuel is no longer available to maintain the satellite in its parking place above the equator. The consumption of this fuel in maneuvering shortens the useful life of the satellite.

In a recent launch of a geostationary satellite, an anomaly occurred during the launch which caused the satellite to not land in its proper geostationary position. The decision was made to not consume the fuel needed to move the satellite into its proper spot; rather, the satellite was let free to orbit at an inclination of approximately 1.8° relative to the equatorial plane. A satellite orbiting the earth in an inclined axis tends to assume a figure 8 configuration with the crossover point of the 8 being located over the equator. The satellite then moves in an elongated figure 8 configuration ascending upward toward the northern hemisphere to a maximum excursion point and then descending to cross the figure 8 to a southern maximum excursion point and then back north again.

The usual method of following a satellite in space, particularly a satellite in a high inclination elliptical orbit, is to focus an antenna on the satellite and then, use an appropriate servo system, and RF peak sensing to maintain the antenna focused at the satellite. The antenna mount must be a complex mechanical structure in order to allow the antenna to move in azimuth plane and in elevation to follow the satellite. The same technique can be used to follow a geosynchronous satellite moving in an inclined orbit. In either case, the electronics and hardware required for tracking the satellite are extremely complex and expensive.

SUMMARY OF THE INVENTION

In accordance with the present invention, applicant has developed a system and method for following a satellite moving in an inclined orbit which uses a simple linear mount for the antenna and single axis time referenced tracking techniques rather than the aforementioned complex signal sensing and servo control systems. The mount for the receiving antenna can be positioned anywhere on the surface of the earth within the footprint of the satellite and will follow the satellite by moving in a linear plane. The system also provides for periodic sampling of the signal from the satellite and comparison of the received signal against a stored signal value to verify the trajectory of the satellite. If the difference between the sample and stored signal exceeds a predetermined value over an extended period of time, the system recalculates the trajectory and a new time referenced tracking control signal for the linear antenna mount so that an optimum signal is received from the satellite. Also, in the event of total satellite signal loss, the system can automatically reacquire the signal, calculate the trajectory of the satellite and prepare a new time reference control signal.

DETAILED DESCRIPTION OF THE PREFERRED EMBODIMENTS

Figure 1:
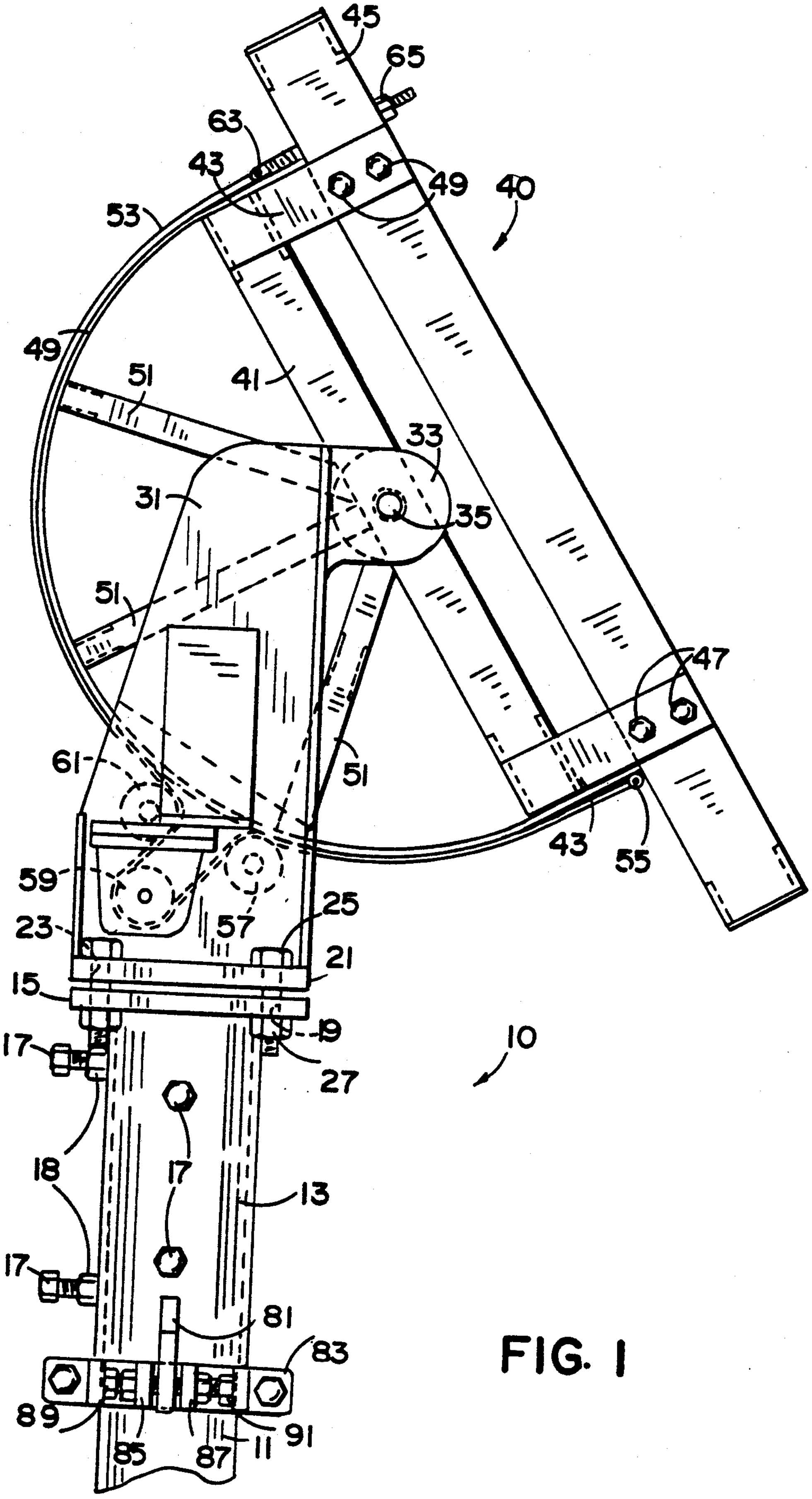
FIG. 1 is a side elevational view of the linear antenna mount.
Figure 2:
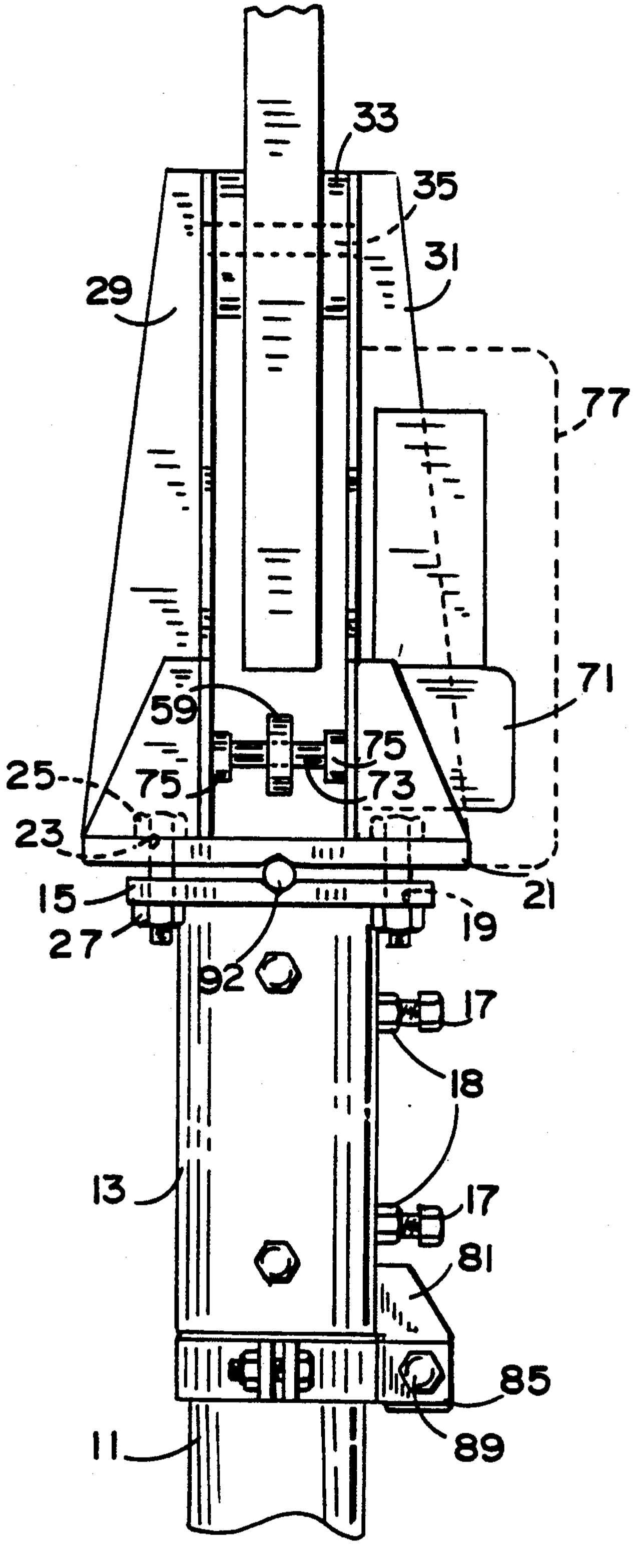
FIG. 2 is rear elevational view of the linear antenna mount.

Referring to FIGS. 1 and 2, the linear antenna mount of the present invention is shown and indicated generally by the number 10. A ground post 11 supports the antenna mount in the earth. The ground post is preferably made of heavy wall steel tubing and, for stability and weather resistance, is preferably set in a concrete pad. A tubular member 13 is supported by a cap plate 15 and is mounted for rotation on the ground post 11. The tube 13 telescopes over the ground post 11 in a relatively tight fit to avoid vibration or wobble in the antenna mount. A plurality of spaced bolts 17 and locking nuts 18 are mounted in threaded apertures in the tubular member 13 and are used to lock the two tubular members firmly in place.

The cap plate 15 is fastened to the depending tubular member 13 by welding (not shown) to provide a strong mechanical connection. The cap plate 15 is made of heavy steel, is substantially square and has an aperture 19 near each corner where the plate projects out beyond the tubular member 13.

The base plate 21 for the antenna mount is also made of heavy steel and is substantially rectangular in shape. The base plate 21 also has apertures 23 formed therein in alignment with the apertures 19 in the cap plate 15. Threaded bolts 25 and mating nuts 27 are used to fasten the base plate 21 to the cap plate 15.

As best shown in FIG. 2, a pair of upstanding shaft support members 29 and 31 are shown extending upwardly from base plate 21. The shaft support members are preferably welded to base plate 21. Each of the upstanding shaft supports 29 and 31 has a portion 33 extending away from the upper portion of the shaft supports (FIG. 1) which supports a shaft 35.

An antenna mounting frame, indicated generally by the number 40, is supported for rotation about the shaft 35. The antenna mounting frame has a base member 41, which has an aperture therein (not shown), through which the shaft 35 passes. A suitable bushing or bearing can be used to reduce friction between these two members. At each end of the base member 41 is fastened a support member 43, which extends outwardly away from the base member, and is then closed by another frame member 45 which is fastened to the members 43 by bolts 47. The antenna mounting frame 40 is designed to be a universal-type mount to which any one of several on-line or offset parabolic reflecting antennae can be mounted. The mount can also be used to support a horn antenna. The antenna mounting frame can be made of steel for strength or can be made of a lighter metal, such as aluminum; however, if a combination of metals is used care must be exercised to protect the combinations from galvanic action and from the possible generation of interfering electrical noise.

A wagon wheel-type drive belt support frame is fastened at each end to the members 43 and is braced by a plurality of spokes 51 projecting outwardly from the member 41 adjacent the shaft 35. The spokes 51 can be welded to the frame member 41, and to the belt guide 49, to form a strong unitary construction. A drive belt 53 is fastened at 55 to the frame member 45 and is then directed over a first idler wheel and shaft 57 to a drive wheel 59 and to a second idler wheel and shaft 61 and then smoothly about the surface of the guide frame 49 where it is attached to a threaded adjustable member 63 which passes through the frame member 45. A threaded nut 65 is mounted on the threaded member 63 and can be turned to adjust the tension of the drive belt 53. The idler wheels and shafts 57 and 61 help to keep the belt 53 in close contact with the surface of the "wagon wheel" belt guide 49 to apply frictional pressure to the antenna mount to keep it from slipping. The drive belt 53 can be made of a flat metal chain or a reinforced elastomeric material. The drive belt can be in the form of a reinforced rubber-like material having a cog surface to assure positive drive between the sprocket 59 and the driven belt 53 in the rotation of the antenna supporting frame 40. A bicycle-type chain is preferred in which case the idler wheels can be changed to gears and the driving wheel would be a chain sprocket gear.

An electric motor 71 is fastened to the upstanding shaft support member 31 and has a driven shaft 73 extending away from the motor through a pair of bearing members 75 which are mounted across from each other on the interior of each of the upstanding shaft support members 29 and 31. The driven shaft 73 supports the driving wheel or sprocket 59 which moves the belt 53 in moving the linear antenna mount. A suitable gear drive (not shown) can be used with the electric motor.

The electric motor 73 can be of the AC or DC type. It is preferred to use a DC motor for ease of reversal of the movement of the linear antenna mount. The preferred DC motor is a 1/30 hp motor which, in combination with a gear drive, has been found suitable for moving loads up to 500 lbs. Being able to consistently and safely move this much weight enables the antenna mount to not only carry the antenna assembly, but also enables electronic equipment such as preamplifiers and receivers to be mounted in close proximity to the antenna for movement with the antenna. A cover 77 is shown schematically in FIG. 2 and is used to protect the electric motor 71 and any electronics mounted above the motor.

When the antenna mount 10 is installed to support an antenna, within the footprint of the orbiting satellite, it is important that the azimuth of the mount be precisely set relative to the north/south direction. In order to provide for azimuth adjustment the tubular member 13 can rotate about the antenna post 11 until the correct azimuth is approximately obtained. In order to fix the tubular member 13 and, in turn, the linear antenna mount in position, a heavy metal adjustment member 81 is used. The adjustment member 81 is preferably welded to the tube 13 and projects downwardly beyond the tube 13 parallel to the ground post 11. A collar 83 is then fastened about the ground post 11 and slid upwardly so that a pair of journal blocks are positioned on either side of the depending adjustment member 81. Each of the journal blocks 85 and 87 has a threaded aperture therein which support a bolt and nut combination 89 and 91, respectively. As indicated previously, an approximate azimuthal determination is made and then the collar 83 can be raised to capture the depending adjusting member 81. The bolts 89 and 91 can then be used to move the adjusting member to precisely orient the antenna to the proper azimuth. Once adjusted, the bolts can be brought to bear tightly against the adjustment member 81 to hold it in place with the nuts on each bolt then being brought tightly into contact with the journal blocks to lock the entire assembly in place. The bolts 17 and locking nuts 18 can then be used to tightly clamp the collar 13 to the ground post 11 so that the force required to hold the antenna mount in position is not dependent on the collar 83 and the adjustment member 81.

As discussed previously, a satellite orbiting in an inclined axis relative to the equatorial plane will move in a figure 8-type pattern upwardly over the northern hemisphere and then downwardly over the Pacific Ocean. A satellite antenna within the footprint of the satellite can track the satellite by monitoring the entire path of the figure 8 or, as has been found in the instant invention, a linear antenna mount can be used to track the center longitudinal axis of the satellite figure 8 orbital configuration. The antenna mount supporting the antenna is fixed on the surface of the earth and its geographic location relative to the north/south axis is determined. The direction of the orbiting satellite is then determined relative to the geographic location of the antenna mount. If the antenna mount is close to the longitudinal axis of the figure 8, a parabolic reflector, having a centered antenna, can be used. As the antenna mount is moved further away from the longitudinal axis of the figure 8, a parabolic reflector with an offset antenna is preferred to tilt the angle of the received signal. Also, the antenna mount itself has a longitudinal tilt adjustment feature 91, which is positioned between the cap plate 15 and the base plate 21, in a slight recess in each surface. The longitudinal tilt adjustment can be a steel rod which supports the weight of the antenna mount and enables the bolt and nut combinations 25 and 27 to be adjusted so that the entire mount is tilted for the proper longitudinal inclination desired. The combination of an offset antenna and the longitudinal tilt adjusting feature on the antenna mount enables the parabolic reflector to be positioned so that a narrow aperture antenna can be used in combination with a single axis linear mount to track the entire orbital path of the satellite moving in an inclined axis.

After the ground post is positioned and the azimuth determination is made relative to the north/south longitudinal axis, the location of the satellite relative to the linear antenna mount is then determined. This determination can simply be made by moving the antenna mount and monitoring a receiver or field strength meter in a conventional manner until the maximum signal strength is received from the satellite. The trajectory of the satellite is then determined relative to the position of the antenna mount and the antenna is aligned with the longitudinal axis of the figure 8 pattern.

In the conventional technique for monitoring the orbit of the satellite, the receiving antenna would be pointed at the satellite at all times and would move in azimuth and in elevation in order to continually receive the signal from the satellite. This technique for receiving the signal requires a complicated antenna mount and sophisticated RF peaking electronics to continually control the movement of the mount to provide maximum signal strength for the received signal.

In accordance with the present invention, Applicant has found that once the geographic location of the antenna mount is determined and the direction of the orbiting satellite is determined, three satellite position determinations can be made over a period of time and that information can be used to calculate the trajectory of the satellite and the longitudinal axis of the satellite figure 8 orbit. If measurements are taken, for example, at three hour intervals, three determinations can be made in the course of six hours. On the basis of the position determinations made, the known period of the satellite orbit and its direction relative to the antenna mount, the sinusoidal wave corresponding to the trajectory of the satellite, relative to this position on earth, can be calculated and used to precisely align the antenna with the longitudinal axis of the trajectory of the satellite. From this data, a time referenced tracking control signal can be calculated and used to actuate the motor 71 on the antenna mount 10. The linear antenna mount 10 is capable of elevation angles of $-20°$ to $+180°$. The antenna supported by the mount is then capable of following the entire longitudinal axis of the satellite as it moves north and south along its longitudinal axis in its inclined orbit.

In calculating the trajectory of the satellite, the antenna is assumed to move up and down the longitudinal axis of the figure 8 pattern with the east/west deviation ignored. The receiver 111 can monitor a broad band of signals or can select a particular frequency. An initial RF peaking measurement is made and the value stored. Thirty-six spaced RF peak measurements are then made at five minute intervals, five minutes at 8. inclination=0.85 system accuracy, this equals three hours. The system then stores five RF peaks and averages the value. It then repeats the process and again determines an average value.

The initial, intermediate and final values are measured over six hours which amount to approximately one-quarter of a sideral day, 23 hours, 56 minutes and 4 seconds. Given that the longitudinal axis or a single line in being monitored, it actually amounts to approximately one-half of the sideral day. The sideral day, equatorial day and period of the satellite orbit are all of the same length. The three values can then be used to calculate an acceptable satellite trajectory.

The antenna sees the satellite moving north and south. The satellite also moves much faster in the middle of the figure 8 than at the ends. This motion corresponds to a sinusoidal wave. In order to use time referenced tracking, this change has to be taken into consideration. For example, for 0.1° accuracy the antenna is moved in 0.1° increments. The driving pulses will be relatively close together in the center of the orbit, approximately every five minutes. Near the ends of the orbit the driving pulses will be spaced approximately 1 hour or more. The frequency of the drive pulses is dependent on the inclination of the orbit of the satellite.

Figure 3:
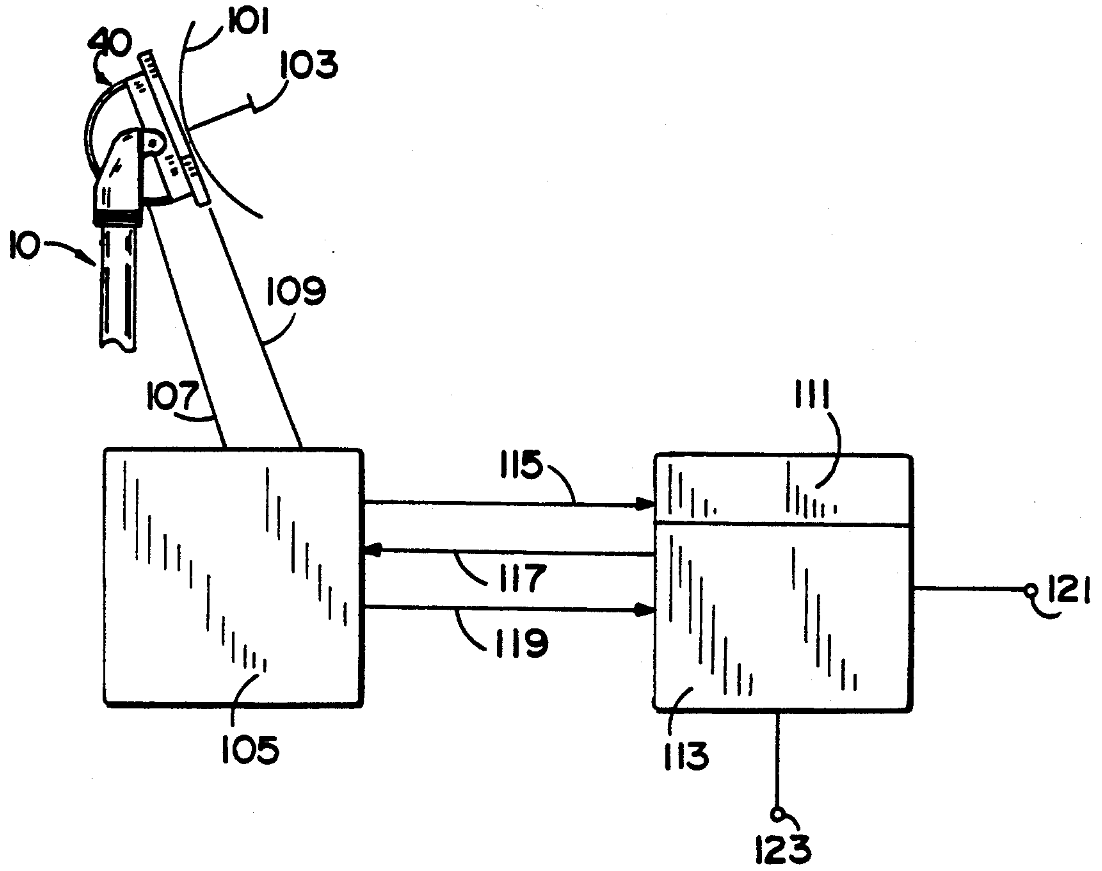
FIG. 3 is a block diagram showing the basic features of the present invention.

Referring to FIG. 3, the schematic representation of the system of the present invention is shown. The linear antenna mount 10 has a parabolic reflector 101 mounted on the antenna supporting frame 40. An antenna 103 is shown offset from the focal point of the parabolic reflector. The control unit for the linear mount is indicated at 105. The control mount provides pulse DC signals to the motor 71 to drive it in either direction. For example, positive rectified AC pulses can be sent to the motor 71 at 8.33 msec intervals to drive the motor and the antenna mount in one direction while opposite phase rectified AC pulses can be used to drive the motor and antenna mount in the opposite direction. It has been found that the antenna mount exhibits a substantially 0 backlash in view of the mass of the antenna mount frame and antenna being driven by the motor. The motor drive signals are applied to the motor over line 107 while line 109 provides RF signals to the receiver 111 which is shown connected to, or in a common block with, the control unit 113. The RF signals pass to the receiver 111 over the conductor or line 115 while drive pulses for the motor 71 and servo return pulses from the motor 71, or other suitable feedback means such as a shaft encoder, are returned to the control unit 113 over lines 117 and 119, respectively. The control unit 113 is used to calculate the trajectory of the orbiting satellite and to calculate the time referenced tracking signal for the linear mount 105. A data input 121 is provided for the remote entry of trajectory data from an external computer, keyboard or modem, as examples and not by way of limitation. The control unit 113 also has a port 123 which can be connected to an autodialer (not shown) for external data reporting and for signalizing in the event of a major fault.

The system employs time referenced tracking for the antenna mount rather than the complex continual tracking signals which are normally used. Once the time referenced tracking signal is started to move the antenna along the longitudinal axis of the inclined satellite trajectory, a narrow aperture antenna can be used in this single axis tracking system. The control unit 113 periodically samples the signal from the receiver 111 and compares the sample signal against a stored anticipated signal value. If a deviation greater than + or $-0.05°$ is determined over a several day interval then a new trajectory is calculated and a new time reference tracking signal is generated to correct the antenna movement. The change can be required due to gravitational effects and because of small housekeeping maneuvers made by the earth station controlling the orbiting satellite. The tracking system automatically monitors the trajectory of the satellite and recalculates the trajectory and restores the time referenced tracking mode.

The receiver and control unit for the antenna mount also includes provision for handling momentary loss of signal from the satellite and for recovering from complete shutdown of the system. In periods of heavy rain, snow or dust, it is possible that the signal from the satellite will be substantially weakened. The system has a delay built into it to compensate for these temporary aberrations so that the control unit does not start randomly calculating new trajectories for the satellite based on the different signal detected. If the system undergoes a complete power failure for an extended period of time, the system is capable on being repowered of searching for the satellite at its expected position depending on the time of the shutdown and recapturing the satellite, calculating a new trajectory and a new time reference tracking control signal.

Since the tracking system used with the linear antenna mount is based on time reference tracking rather than continual monitoring of the satellite and signal peaking, it is possible to use other types of motors to control the motion of the antenna. For example, stepper motors and servo motors can be used, as well as motors equipped with absolute encoders which report the present position of the antenna mount and not just movements of the mount.

The preferred antenna mount for use in the tracking and control system of the present invention is a linear mount. Applicant does not wish the invention to be so limited, however, since it is possible for a polar mount or non-linear tracking system to be used in a similar manner if appropriate corrections are made to compensate for the non-linearity of the mount. It can be seen from the above description that an improved satellite tracking system has been developed which substantially simplifies the task of monitoring the signal transmitted by a satellite moving in an inclined orbit.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A system for tracking a satellite in an inclined orbit comprising:
- a linear mount for supporting an antenna; and
- a control unit for determining the trajectory of said satellite and for providing control signals to said linear mount to cause said mount to move in a time referenced tracking mode in following the movement of said satellite
- wherein said control unit further comprises:
- a receiver for receiving signals transmitted by said satellite and for providing such signals to said control unit to enable said control unit to determine the trajectory of said satellite
- wherein in the event of a system failure, on restart said receiver and control unit will search for and reacquire the signal from said satellite, calculate the trajectory and establish a new time referenced trajectory control signal for said linear mount.

2. A system for tracking a satellite moving in an inclined orbit comprising:
- a linear mount for supporting an antenna and for moving in declination in response to control signals for a control unit;
- a receiver for receiving signals transmitted by said satellite and for providing signal data to a control unit; and
- a control unit for determining the trajectory of said satellite based on at least three time spaced satellite position determinations spaced approximately 3 hours apart and for calculating a time referenced tracking control signal for controlling the movement of said linear mount in relation to the movement of said satellite.

3. A method for tracking a satellite in an inclined orbit comprising the following steps:
- providing a linear mount for an antenna;
- aligning said linear mount in a north/south direction in accordance with the geographic location of said linear mount;
- determining the angular direction of said satellite from the geographic location of said linear mount;
- determining the trajectory of said satellite relative to the geographic location of said linear mount;
- determining a time referenced tracking control signal based on the trajectory of said satellite; and
- providing said time referenced control signal to said linear mount to enable an antenna on said linear mount to track said satellite.

4. A method for tracking a satellite as set forth in claim 3 wherein the trajectory of said satellite is calculated on the basis of at least three time spaced satellite position determinations.

5. A method for tracking a satellite in an inclined orbit comprising the following steps:
- providing a linear mount for an antenna;
- aligning said linear mount in a north/south direction;
- determining the angular direction of said satellite from said linear mount;
- determining the direction and location of the satellite using field strength measurement and moving the antenna for maximum signal input;
- determining the location of said satellite at at least three time spaced positions;
- determining the location of said satellite relative to the geographic location of said linear mount;
- calculating the sine wave curve corresponding to the trajectory of said satellite using the input data from the previous steps; and
- determining a time reference tracking control signal based on said trajectory and providing said time referenced control signal to said linear mount for controlling the movement of said antenna.

6. The method of tracking a satellite as set forth in claim 5 including the following steps:
- sampling the signal from the satellite and comparing it against the anticipated signal strength;
- if the signal strength is greater than a predetermined deviation over a period of time, calculate a new satellite trajectory based on the input data and assume it is the new satellite trajectory; and
- periodically repeat the above procedure to provide for automatic trajectory adjustment.

7. A method for tracking a satellite as set forth in claim 5 wherein said time referenced tracking control signal causes said mount to move an antenna in a linear path.

8. A method for tracking a satellite as set forth in claim 5 wherein said time referenced tracking control signal causes said linear mount to move in declination.

9. A method for tracking a satellite as set forth in claim 5 wherein the direction of said satellite from said linear mount is found by determining the antenna direction and elevation which provides the maximum received signal from said satellite.

10. A linear mount for a satellite tracking antenna comprising:
- an upstanding support;
- a support member mounted for rotation on said upstanding support, said support member comprising a tubular member for telescoping over the end of said upstanding support and a cap plate for resting on the top of said upstanding support and for supporting said tubular member;

a base plate fastened to the top of said cap plate;

a pair of spaced upstanding shaft supports mounted on said base plate;

a shaft mounted for rotation near the end of said shaft supports and extending across the opening between said shaft supports;

an antenna mounting frame supported by said rotatable shaft;

an arcuate driving belt guide depending from said antenna mounting frame between said upstanding shaft support;

a drive motor supported by one of said upstanding shaft supports; and a driving wheel supported by said drive motor in the space between said upstanding shaft supports, a driven belt supported about the surface of said arcuate belt guide and about said driving wheel so that rotation of said driving wheel will cause said antenna mounting frame to move in elevation.

11. A linear mount as set forth in claim 10 wherein said support member can rotate on said upstanding support for azimuth adjustment of said antenna mounting frame.

12. A linear mount as set forth in claim 10 wherein said upstanding support is a tubular member and said support member comprises a tubular member which can telescope over said upstanding support, said tubular member depending from a plate member which rests on the top edge of said upstanding support.

13. A linear mount as set forth in claim 10 including an adjustment member depending from said tubular member; and a collar for clamping to said upstanding support and having a pair of spaced journal blocks extending therefrom for positioning on either side of said adjustment member, each of said spaced journal blocks having a threaded aperture therein, a threaded fastener mounted in each of said journal blocks for moving said adjustment member for fine azimuth adjustment of said antenna mount.

14. A linear mount as set forth in claim 10 including a longitudinal tilt adjustment for said antenna mounting frame.

15. A linear mount as set forth in claim 14 wherein a longitudinal tilt adjustment member is mounted between said cap plate and said base plate to vary the angle of the spacing between said plates.

16. A linear mount as set forth in claim 10 wherein said driven belt is a flexible belt having cogs on one surface thereof for cooperating with cogs on the surface of said driving wheel to prevent slippage of said driving belt and misadjustment of said antenna mounting frame.

17. A linear mount as set forth in claim 16 including a pair of spaced idler wheels for maintaining the position of said driven belt relative to the surface of said accurate driving belt guide surface.

18. A linear mount as set forth in claim 10 wherein at least one spoke extends from said antenna mount near said rotatable shaft and supports said arcuate driven belt guide surface.

19. A linear mount as set forth in claim 10 in which said rotatable shaft is fixed and said antenna mounting frame rotates about said fixed shaft.

20. A linear mount as set forth in claim 10 wherein said upstanding support is a ground post.

21. A linear mount as set forth in claim 10 wherein said driven belt is a chain and said driving wheel is a sprocket for said chain.

* * * * *